Nov. 12, 1968   JEAN-PIERRE L. R. HARIVEL   3,410,725
ELECTRIC STORAGE CELLS
Filed Feb. 4, 1966                                     2 Sheets-Sheet 1

INVENTOR
JEAN-PIERRE LOUIS-
RODOLPHE HARIVEL
BY
ATTORNEYS

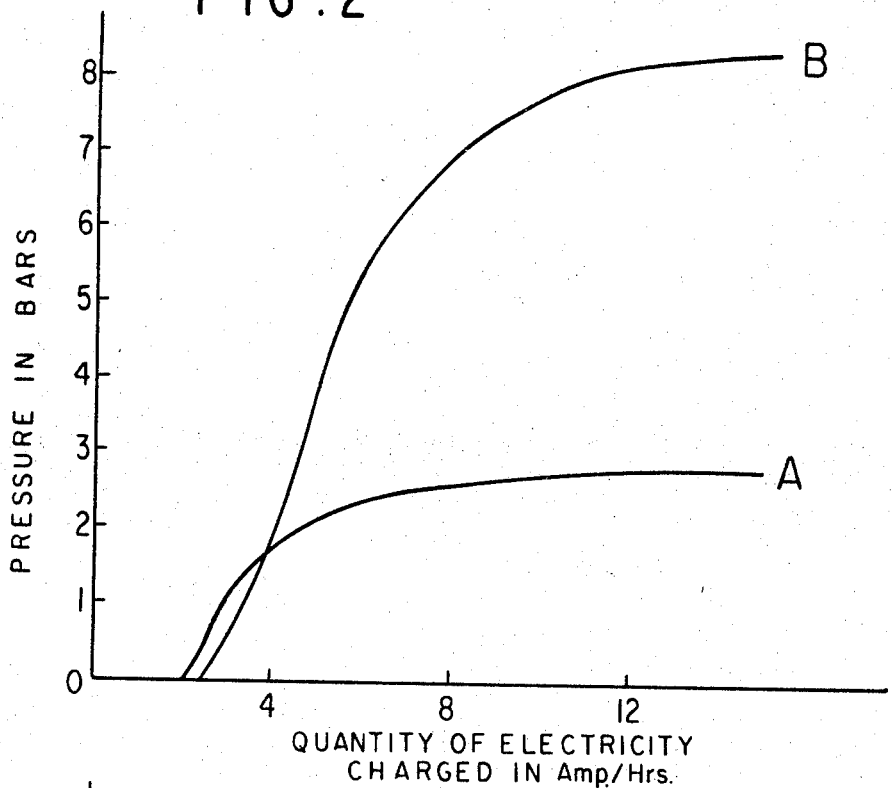
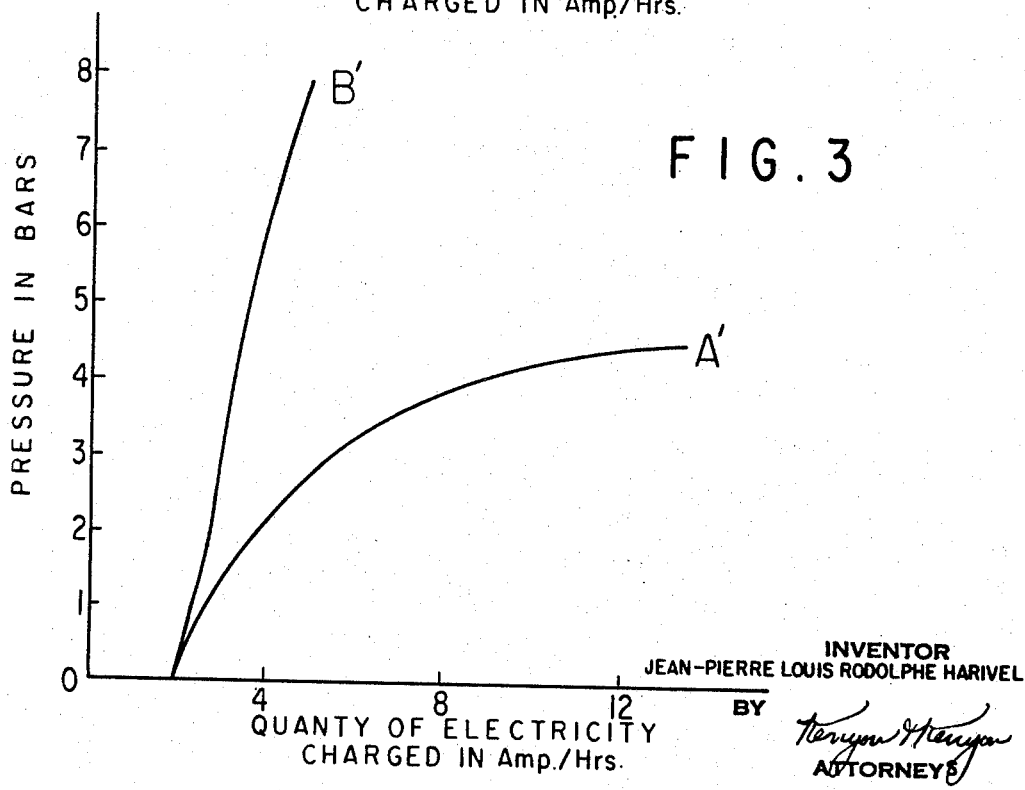

United States Patent Office 3,410,725
Patented Nov. 12, 1968

3,410,725
ELECTRIC STORAGE CELLS
Jean-Pierre Louis Redolphe Harivel, Paris, France, assignor to Societe des Accumulateurs Fixes et de Traction (Societe Anonyme), Romainville, Seine-St-Denis, France, a company of France
Filed Feb. 4, 1966, Ser. No. 525,193
Claims priority, application France, Feb. 24, 1965, 6,894
13 Claims. (Cl. 136—6)

ABSTRACT OF THE DISCLOSURE

Electric cell construction using thin electrodes and separators and permitting high intensity charging current to reduce materially the length of charging time without harmful evolution of gases within the cell involving positioning of a porous carrier distinct from the separator bearing a porous deposit of a metal in a divided state which is more electropositive than the metal of the active material of the negative electrode, the carrier being positioned against one face of at least one negative electrode so that the electropositive metal of the carrier is in contact with the metallic active material of the negative electrode, electrolyte being immobilized in pores of the electrodes, separators and carriers.

---

This invention relates to electric storage cells and more particularly to sealed or semi-sealed cells of this type.

It is already known in the art to construct storage cells and more particularly alkaline nickel-cadmium cells in such a way that the oxygen which is evolved on the positive electrodes at the end of the charge can be combined with the negative electrodes thus oxidizing the active material which has previously been reduced during the charging process. From this moment, the charge of the negative electrodes should not continue though the charging process goes on and since these electrodes generally have a greater charge capacity than that of the positive electrodes, i.e., an excess of active material, they must not reach the state of complete charge, so as to prevent hydrogen evolution.

The gas evolution at the end of charging being thus limited, the casing of such cells can either be hermetically closed, or can be provided with a valve which opens only if the gas pressure in the casing becomes higher than a given value, in some circumstances.

In some alkaline nickel-cadmium cells, the transport of oxygen from the positive electrodes to the negative electrodes at the end of the charge is effected in the gaseous state and such transport is promoted by the fact that a separator situated between these electrodes comprises voids that are large enough so as not to be completely filled with electrolyte by capillarity, thus providing free channels for the gaseous oxygen.

In other alkaline cells, on the contrary, the separators comprise only capillary pores which are entirely filled with electrolyte and, far from promoting the transport of oxygen in the gaseous state, everything is arranged in such a way that the oxygen is transferred in the dissolved state in the electrolyte. The thinness of the electrodes which are generally constituted by a very thin carrier of sintered nickel with active material in its pores so that for a given capacity such a cell has a very large surface area of electrodes, the relatively low current density which results from this fact, and last and most important the very small gap of a few tenths of a millimeter maintained between the electrodes provided by thin separator and by a compression of the block of separators and electrodes, are factors which promote the transport of oxygen in the dissolved state.

In cells having sintered nickel plates, it seems that the resorption of oxygen in the cathodic compartments does not result from a purely chemical process, but from an electrochemical process due to the existence in the negative electrodes of a number of small electrochemical cells constituted by the nickel and cadmium particles in contact with each other. These small cells, the nickel particles of which constitute the positive electrode, thus deliver a short-circuit current so that the oxygen in the dissolved state coming from the positive electrode of the cell is consumed by depolarizing these small cells.

However with any kind of structure, the cells known at present in which irreversible phenomena have to be prevented at the end of charging, must be charged with a current which is only a small fraction of their rated capacity; this requires a long time of charging and is of course a serious drawback for the users.

If the charge of such cells is made with too high a current, gaseous oxygen may be seen to be evolved in substantial amounts at the end of the charge from the block formed by the electrodes and separators. This oxygen which has not been resorbed has its origin in the fact that the rate of oxygen consumption in the cathodic compartment or on the cathode is smaller than the rate of formation of oxygen on the anode. Hydrogen may even be evolved on the negative electrode because the accumulation of oxygen under pressure causes a delay in the depolarization of the negative electrode so that the latter acquires a corresponding advance in its charge.

In the French Patent 1,218,433, filed May 21, 1958, invented by Douchan Stanimirovitch and assigned to the same assignee as this application, it has already been proposed to put the negative electrodes of a sealed alkaline nickel-cadmium cell in electrical connection with an auxiliary electrode made of a porous layer of a finely divided metal, more electropositive (higher in the (European) scale of potentials) than the cadmium and more especially of nickel, cobalt, platinum, palladium or copper, said layer being parallel to the outer surface of the electrodes and being carried by the separator situated between the main electrodes of the cell.

This disposition was intended to promote the depolarization of the small Ni-Cd cells and to prevent hydrogen evolution at the end of the charge.

This disposition has however some drawbacks which prevented its practical development. More particularly, the finely divided metal plated on the separator it was found could cause short-circuiting between the main electrodes.

A principal object and feature of this invention is to remedy these drawbacks.

Applicant has now found that with the aid of a metal more electropositive than the active material of the negative electrode, it is possible in certain conditions of application to obtain a new and surprising result, namely, the possibility of substantially increasing the intensity of the charging current of the cell, more especially at the end of the charge, and, as a consequence, of lessening the length of charging time without apparent evolution of harmful gases in the cell.

According to one characteristic and feature of the invention, the metal more electropositive than cadmium, in a divided and porous state, is applied in close engagement with the surface of at least one negative electrode, on a porous carrier distinct from the separator and is prepared separately, said carrier either being placed between the surface of the negtive electrode and the separator, or in the case of one face of one negative electrode being exposed at one end of the electrode block, being placed against this face.

An advantage of this improvement is that the porous carrier distinct from the separator can be plated with the maximum amount of electropositive metal that it can carry without having to take any special precautions, any short-circuit between the main electrodes being safely prevented since the separator wholly retains its insulating properties.

In order to prepare the novel carrier covered with electropositive metal, any method can be chosen. A particularly advantageous method will be hereinafter described.

It will be particularly advantageous to utilize chemical dissociation of a salt of the selected metal and to precipitate this metal on a porous carrier, e.g. made of synthetic fibers, which will be applied on the negative electrode surface.

Another characteristic of the invention is the selection of silver as a metal more positive than cadmium.

It has been observed that this metal which is easy to plate on the carrier by chemically dissociating a silver salt such as a silver nitrate, gives a remarkable and unforeseen result in that the rate of charging of a sealed nickel-cadmium cell can be given values several times higher than the limit recommended up to now without having the gas pressure climbing to dangerous values within the cell at the end of the charge and during overcharge.

The invention is particularly useful in the case of nickel-cadmium or silver-cadmium cells, the electrodes of which are constituted by thin sintered plates having a thickness of 1 mm. or less, separated from each other by a distance of a few tenths of a millimeter, this distance being maintained between the electrodes by a separator a few tenths of a millimeter thick and by compression of the block structure of the electrodes and the separators.

Other objects and features of the invention will become apparent from the following description in relation to the annexed drawings, given as a non-limitative example as an aid in understanding a manner of realizing the invention, the characteristics found either in the description or in the accompanying drawings being, of course, part of the invention.

In the drawings:

FIGS. 2 and 3 are curves illustrating the results obtained with such a cell, the capacity of which was 3.4 a.h.

Figure 1:
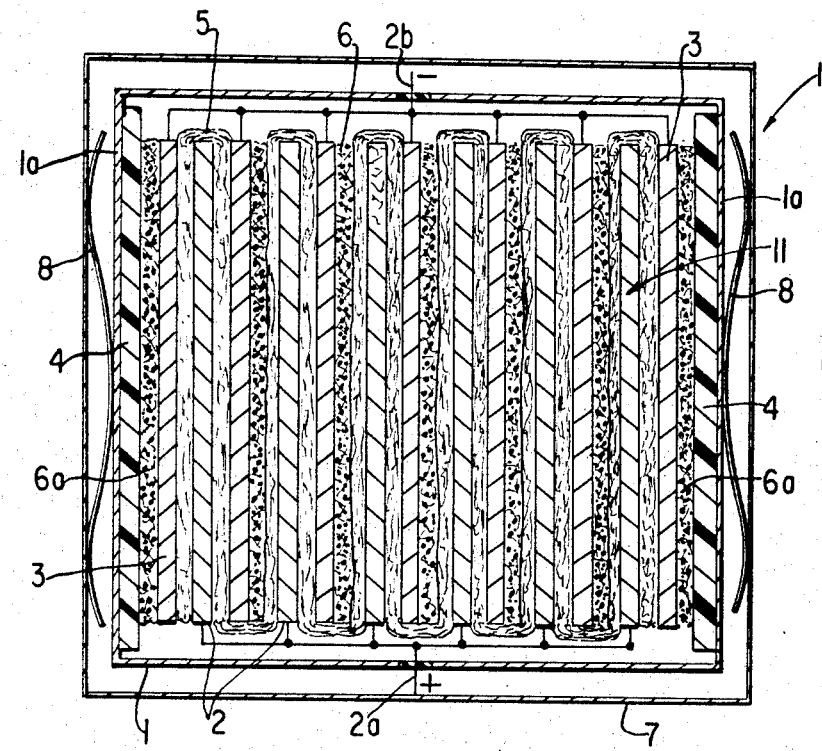
FIG. 1 is a diagrammatical horizontal section of a first embodiment of a sealed alkaline cell of the nickel-cadimum type, improved according to the invention.

The cell 10 diagrammatically shown in FIG. 1 comprises a preferably metallic casting 1 that is hermetically sealed after assembly. This cell includes six positive electrodes 2 which are parallel-connected to a terminal 2a, and seven negative electrodes 3 which are parallel-connected to a terminal 2b so that the electrode block is end-faced by two negative electrodes 3 which can be insulated from the metallic casing by two sheets 4 of an insulating material. It is obvious that FIG. 1 is diagrammatic without showing details of the usual structural features which are well known to the skilled art, in order to render the drawing clearer and the following explanations easier to understand.

The electrodes 2 and 3 are made preferably of porous sintered nickel plates impegnated with active material, viz, nickel hydroxide to which may be added cobalt hydroxide for the positive electrodes 2 and cadmium hydroxide for the negative electrodes 3. The sintered plates are of known thin type, the manufacture of which has been developed by the applicant's assignees, i.e., their thickness is about 0.9 mm. for the positive plates and about 0.8 mm. for the negative plates.

In another embodiment of the invention, the active material of the positive electrode is an active silver compound such as silver oxide.

Between the electrodes, there is placed a porous insulating separator 5 (represented by a dotted line) made of a felt, a blotter material or a woven fabric of synthetic fibers such as "nylon." This separator may also comprise two juxtaposed different layers, one made of a nylon fabric and the other of a felt, the thickness of this separator being in any case small, in the range of 0.1 to 0.3 mm. As shown in the drawings, this separator may be a continuous band which is folded in zig-zag fashion between the electrodes, or it may be made of separately cut sections placed individually in the gaps between the respective positive and negative electrodes.

A porous layer 6 comprising a finely divided metal more electropositive than cadmium, such as silver, is in contact with each negative electrode 3.

In the example described here, each of such porous layers is prepared in the following manner. A carrier 6 having the same dimensions as the negative electrodes is made of a nylon felted fabric having a thickness of about 0.1 to 0.2 mm. when in uncompressed state. This carrier is impregnated with a silver nitrate solution whose concentration is about 50% by weight. Then, on removal and after a short dripping time in air, the carrier is immersed in a hydrazine solution whose concentration is about 50% by volume, at room temperature (about 20° C.) and stirred for about one minute. The silver nitrate then is dissociated, reduced silver precipitating according to the reaction.

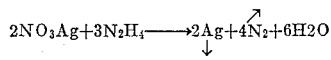

$$2NO_3Ag + 3N_2H_4 \longrightarrow 2Ag + 4N_2 + 6H_2O$$

The silver precipitates in a porous divided state on the surface of the fibers of the carrier.

The carrier on being taken from the hydrazine solution is then washed with a great amount of water to carry off the hydrazine and left dripping. After dripping the just-described cycle is repeated several times in order to increase the volume of silver plated or deposited on the carrier.

The cycles are eventually followed by drying of the plated carrier for about fifteen hours at about 70° C.

In this way the carrier obtained bears a porous layer of reduced finely divided silver.

Several carriers thus prepared are placed in the cell as shown at 6 in FIG. 1, each one being positioned between the active surface of a negative electrode 3 and the separator 5 so that the layer of finely divided silver is in contact with the active face of the corresponding negative electrode, without however touching the positive electrode, due to the presence of separator 5. For both end negative electrodes, it is possible to place the carrier outwardly of and against the outer exposed surface of the negative electrodes as shown at 6a in FIG. 1, in order to act upon the oxygen which can escape in the cell atmosphere around the electrodes.

Of course, the cell 10 is provided before sealing with the amount of electrolyte required for filling all the existing pores in the electrodes, in the separator 5 and in the carriers 6, without having free electrolyte, the whole amount of electrolyte being retained in the pores.

The block 11 comprising the electrodes 2, 3, the separator 5 and the carriers 6 plated with divided silver, is maintained under pressure in the casing 1 through its outer faces which are parallel with the electrodes, so that the engagement of the various surfaces is as close as possible. The end insulating sheets 4 may play a part in this compression if they are given a suitable thickness. Moreover, the casing faces 1a parallel to the electrodes may cooperate with pressure means situated out of the casing 7, said faces which are preferably made of thin steel sheets being yieldable enough to convey this external pressure to the electrode block 10. Such pressure means may, for instance, comprise a belt 7 enclosing the casing 1 with the interposition of plate-springs 8 between this belt and the faces 1a of the casing. Such compression means are known in themselves.

A cell 10 thus constituted, having a rated capacity C of about 3.4 a.h. which corresponds to electrode dimensions of 5.0×4.4 cm., i.e., 22 cm.² of surface area on each face, was charged first with a current at an intensity of C/2=1.7 a., while the pressure in the casing was measured by means of a manometer. By plotting as ordinates the pressures thus determined in bars, and as abscissae the amount of charged capacity in amperehours, curve A was obtained as shown in FIG. 2. In this curve, it may be seen that there is a stabilization of the pressure within the casing at a value lower than 3 bars which is quite allowable in a casing made of thin sheet steel.

On the contrary, a cell identical to cell C except that the carriers 6 or 6a plated with reduced silver were omitted, gave in the same conditions curve B which it can be seen shows a much steeper increase of the pressure with final values higher than 8 bars and therefore dangerous.

Another cell 10, also constructed according to what was described in relation to FIG. 1 and charged at a current intensity equal to C gave the curve A' of FIG. 3 with a pressure which is stabilized at a value between 4 and 5 bars. For this value of the charging current an identical cell, but without the silver carrier layers 6 and 6a gave rise to a steep increase of pressure shown in curve B' without stabilization, so that the test had to be stopped after charging 4 a.h., or the casing would have burst.

Thus it may be seen that the result of the invention is quite remarkable and unexpected, considering that until now the charging rate of the storage cells of such type had to be limited at the end of the charge to less than $\frac{1}{10}$ of the rated capacity, i.e. in this case 0.34 a.

In order to explain this result, the following hypothesis may be made, however, binding the invention to this hypothesis.

The oxygen evolved at the end of the charge of the positive electrode, diffuses and is reduced on the mixed electrode which comprise both particles of silver and particles of cadmium, the metallic cadmium being obtained by the reduction due to the charging current of the cell.

Due to the divided state of the chemically plated metallic silver and to the formation of an electrochemical couple between this metal and cadmium, the oxygen coming from the main positive electrode which is being overcharged, will be reduced on the cathode of the Ag-Cd couple where the following reduction will take place:

$$\frac{1}{2}O_2 + H_2O + 2e \rightarrow 2OH^- \qquad (1)$$

On the anode of this local couple, the cadmium will be oxidized due to the hydroxyl ions supplied by reaction (1) according to the reaction:

$$Cd + 2OH^- \rightarrow Cd(OH)_2 + 2e \qquad (2)$$
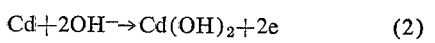

Thus the formation of Ag-Cd local couples considerably increases the reduction rate of oxygen according to (1). It is thus possible to obtain an equilibrium between the rate of reaction (2) which is the absorption on the negative electrode of the oxygen evolved on the positive electrode at the end of the charge, and that of the reaction:

$$Cd(OH)_2 + 2e \rightarrow Cd + 2OH^- \qquad (3)$$
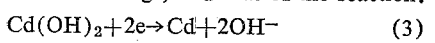

which corresponds to the charge of the negative electrode.

Due to the highly electrically conductive contact between the cadmium of the negative plate and the silver of the added layer 6, the small AG-Cd couples have a maximum output intensity and the rate of consumption of oxygen coming from the positive electrode can be very high, thus allowing for a high charging rate.

The fact that the phenomenon thus added to the operation of the cell has a higher rate than that of the small cells made by the nickel and cadmium particles may be explained by the fact that the impregnating operations of the sintered plates during the manufacturing of the cell, bring a surface attack of the nickel particles thus preventing the contact with cadmium from being highly conductive.

Many different embodiments can be found for the invention and it may be applied to cells of a type different from that which has been described.

Several metals more electropositive than cadmium can exist together on the carrier engaging the positive electrode.

Instead of being put in contact with each of the negative electrodes, the divided metal carrying carriers 6a can be applied in contact with the surface of only one or a few negative plates 3 provided that the oxygen evolved on the positive plates 2 has access to it.

Figure 4:
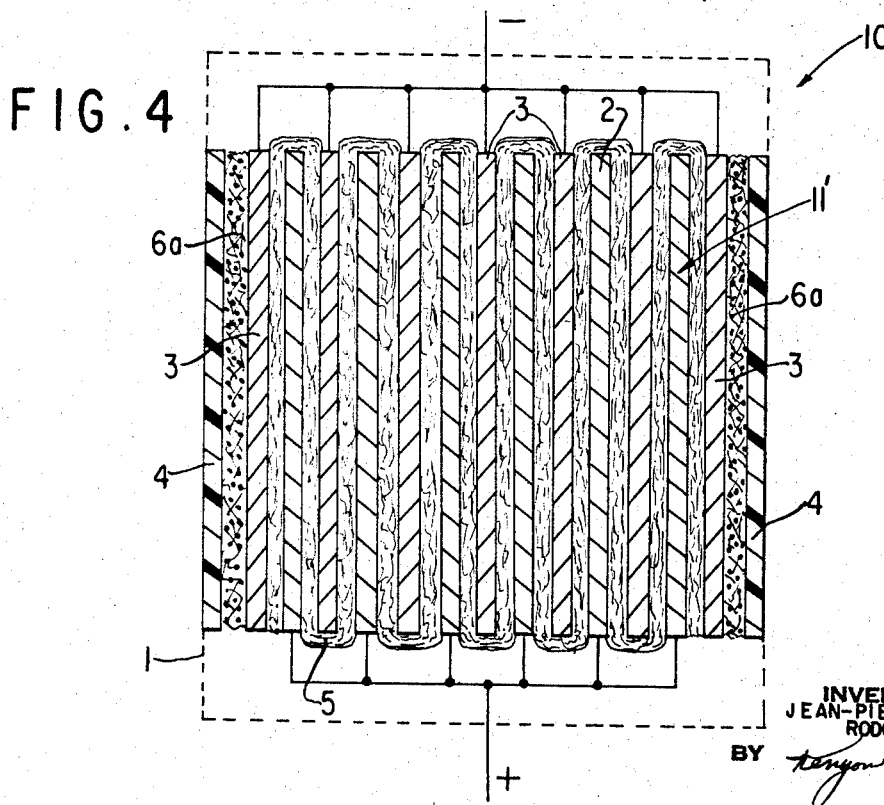
FIG. 4 is a diagrammatical sectional view of another embodiment of the invention.

Thus, for instance, in the cell 10' as shown in FIG. 4, the porous carrier 6a covered with silver can be placed only on the outer faces of the negative electrodes 3 which are situated in the casing 1 at the outer end of the electrode separator block 11' provided, of course, that on these faces the electropositive metal come into contact with the particles of the negative active material in the reduced state towards the end of the charge of the cell. In this case the oxygen which can be evolved towards the end of the charge of the cell, is dissolved in the electrolyte held in the porous carrier 6a and comes to the interface between the divided metal covering said carrier and the outer negative electrodes 3. It is then resorbed and the pressure in the cell is thus limited to the value for which there is an equilibrium between the evolution and the resorption of oxygen.

While specific embodiments of the invention have been shown and described, variations within the scope of the appended claims are possible and are contemplated. There is no intention of limitation to the exact details herein presented.

What is claimed is:

1. In an alkaline storage cell having alkaline electrolyte, positive and negative electrodes respectively bearing metallic compound active materials with a porous separator between the electrodes, the improvement in combination therewith comprising a porous, compressible, absorbent fibrous carrier distinct from the separator bearing a porous deposit of metal in finely divided state which is more electropositive than the metal of the metallic compound active material of the negative electrode, said carrier being positioned against one external face of at least one negative electrode so that the electropositive metal borne on the carrier is in contact with the metallic compound active material of said negative electrode, said electrolyte filling all pores of said electrodes, separator and carrier, said carrier thereby being rendered gas impermeable.

2. In a cell according to claim 1, said electropositive metal being silver.

3. In a cell according to claim 1, said porous carrier comprising synthetic fibers with the electroprositive metal appearing thereon as a fine precipitate dissociated from a compound of said metal.

4. In the cell according to claim 1, said porous fibrous carrier being located in direct contact with an external face of a negative electrode and between said face and an adjacent porous separator which insulates said negative electrode from the adjacent positive electrode.

5. In the cell according to claim 1, said porous fibrous carrier being located against an external face of a unitary negative electrode which face is remote from a positive electrode.

6. In the cell according to claim 1, said electrodes being of sintered porous metal whose pores bear metallic compound active materials as impregnants.

7. In the cell according to claim 1, said electrodes having a thickness not in excess of 1 mm. and being spaced a few tenths of a millimeter apart with said separator positioned therebetween.

8. In the cell according to claim 1, said electrodes, separator, carrier and the electropositive metal of the latter all being porous and said electrolyte being immobilized in the pores thereof.

9. In the cell according to claim 1 an enclosing casing which is hermetically sealed.

10. In a cell according to claim 1, said porous carrier being of insulating fibrous material and bearing a finely divided metallic precipitate on the surface of its fibers.

11. In a cell according to claim 10, said precipitate being finely divided silver.

12. In the cell according to claim 1, means for pressing the electrodes, separator and carrier together.

13. In the cell according to claim 1, an enclosing casing and means external of the casing for maintaining the electrodes, separator and carrier pressed together.

References Cited

UNITED STATES PATENTS

| | | | |
|---|---|---|---|
| 3,057,943 | 10/1962 | Strauss. | |
| 3,193,412 | 7/1965 | Salkind et al. | |
| 3,057,942 | 10/1962 | Smith et al. | 136—6 |
| 3,235,473 | 2/1966 | Le Duc | 204—30 |
| 3,276,909 | 10/1966 | Moos | 136—86 |

WINSTON A. DOUGLAS, *Primary Examiner.*

A. SKAPARS, *Assistant Examiner.*